United States Patent
Core

[11] Patent Number: 5,719,580
[45] Date of Patent: Feb. 17, 1998

[54] METHOD AND APPARATUS FOR DIGITAL COMPENSATION OF VCO NONLINEARITY IN A RADAR SYSTEM

[75] Inventor: Mark Taylor Core, Placentia, Calif.

[73] Assignee: TRW Inc., Lyndhurst, Ohio

[21] Appl. No.: 659,400

[22] Filed: Jun. 6, 1996

[51] Int. Cl.$^6$ .................................................... G01S 13/00
[52] U.S. Cl. ............................ 342/100; 342/132; 367/38
[58] Field of Search .................................. 342/100, 132; 367/38, 43, 49; 371/72

[56] References Cited

U.S. PATENT DOCUMENTS

| | | | |
|---|---|---|---|
| 3,975,731 | 8/1976 | Latham et al. | 343/7.3 |
| 3,979,748 | 9/1976 | Gelleknik | 343/7.3 |
| 4,404,562 | 9/1983 | Kretschmer, Jr. et al. | 343/17.2 PC |
| 4,620,788 | 11/1986 | Giger | 356/5 |
| 4,626,853 | 12/1986 | Lee et al. | 342/132 |
| 4,912,472 | 3/1990 | Reits | 342/128 |
| 4,937,583 | 6/1990 | Poinsard | 342/195 |
| 5,036,324 | 7/1991 | Lampler et al. | 342/132 |
| 5,105,294 | 4/1992 | Degura et al. | 359/154 |
| 5,165,051 | 11/1992 | Kumar | 342/132 |
| 5,189,428 | 2/1993 | Bouvet et al. | 342/132 |
| 5,357,331 | 10/1994 | Flockencier | 356/5 |
| 5,376,938 | 12/1994 | Martinez et al. | 342/128 |

FOREIGN PATENT DOCUMENTS

0414567A2  2/1991  European Pat. Off.
2307746    4/1997  United Kingdom.

*Primary Examiner*—J. Woodrow Eldred
*Attorney, Agent, or Firm*—Tarolli, Sundheim, Covell Tummino & Szabo

[57] ABSTRACT

An apparatus for correcting for nonlinearities in modulation systems includes a transmitter (24, 28, 48, 50, 52) for transmitting a time varying modulated radar signal (56). A receiver (58, 62) receives an echo signal (60) resulting from reflection of the transmitted modulated signal (56). A mixer (48) compares the transmitted signal against the echo signal and providing a comparison signal indicative of the comparison. The comparison signal is sampled by an A/D converter (74). The A/D convertor (74) provides a sampled comparison signal to a controller/DSP (22). Controller/DSP (22) resamples the sampled comparison signal at selected resample times and effectively varies the selected resample times to correct for nonlinearities in the comparison signal resulting from nonlinearities of the transmitted time varying modulated signal.

27 Claims, 7 Drawing Sheets

5,719,580

METHOD AND APPARATUS FOR DIGITAL COMPENSATION OF VCO NONLINEARITY IN A RADAR SYSTEM

BACKGROUND OF THE INVENTION

1. Technical Field

The present invention is directed to frequency modulated ("FM") ranging radar systems and is particularly directed to a method and apparatus for digitally compensating for the effects of voltage controlled oscillator ("VCO") nonlinearity on an intermediate frequency ("IF") waveform of a ranging radar system by using continuously variable multi-rate sampling of the IF waveform.

2. Description of the Prior Art

In an ideal FM ranging radar system, a substantially linear pulse or "chirp" FM waveform is transmitted. A ramp input voltage is applied to the input of a VCO to generate the FM chirp signal. The VCO output frequency varies in response to the voltage ramp signal. The FM chirp signal is transmitted from a transmit antenna toward a target. The target reflects the transmitted chirp signal and returns an echo signal. The reflected echo signal is received by a receiving antenna. The receiving antenna provides the received echo signal to a mixer. In the mixer, the received echo signal is mixed with the transmitted chirp signal and translated into an IF signal. The frequency of the IF waveform is functionally related to the frequency difference between the transmitted and received signals which is, in turn, functionally related to the distance between the target and the transmitting antenna.

However, due to characteristics in an actual VCO, the pulse chirp FM waveform is not linear. As a result of the nonlinearity introduced by the VCO, the IF waveform frequency will not be a single frequency but will, instead, change with time. This changing frequency of the IF signal due to the nonlinearity effects of the VCO is referred to as "smearing." This smearing of the IF signal causes (i) a loss of signal-to-noise ratio ("SNR"), and (ii) ambiguous range resolution.

Typically, the transmitted chirp signal is linearized to prevent smearing of the IF signal. Known chirp signal linearization systems use a closed loop linearizer. In a closed loop linearizer, a frequency discriminator provides a voltage signal proportional to the transmit frequency of the transmitter to one input of a comparator. An ideal voltage ramp is provided to the other input of the comparator. The comparator provides a signal proportional to the difference between the frequency discriminator output voltage and the voltage of the ideal voltage ramp. The comparator output signal is used as an error signal to control the VCO to thereby produce a substantially linear pulse chirp waveform. However, this method is complicated to apply and the cost of the components necessary to implement the closed loop linearizer is relatively high.

SUMMARY OF THE INVENTION

In accordance with the preferred embodiment of the present invention, the effects of RF VCO nonlinearity is corrected by digital processing of sampled IF data. The correction can be accomplished by either (i) non-uniform time samplings of the IF data or (ii) by uniform time samplings combined with numeric interpolation of the sampled IF data onto non-uniform spaced sample points using a continuously variable multi-rate filtering technique.

In accordance with one aspect of the present invention, an apparatus is provided for processing of a time varying signal. The apparatus comprises means for sampling a time varying signal and providing a sampled signal. The apparatus further includes means for resampling the sampled signal at selected times. Means are provided for varying the selected resample times and providing a resampled time varying signal according to the varying selected resample times.

In accordance with another aspect of the present invention, an apparatus is provided for correcting for non-linearities in modulation systems. The apparatus comprises means for transmitting a time varying modulated signal, and means for receiving an echo signal resulting from reflection of the transmitted modulated signal. The apparatus further includes means for comparing the signal against the echo signal and providing a comparison signal indicative of the comparison. Means are provided for sampling of the comparison signal at selected sample times. The apparatus further includes means for effectively varying the selected sample times so as to correct the comparison signal for deviations from a nominal constant frequency resulting from nonlinear frequency modulation of the transmitted time varying modulated signal.

In accordance with another aspect of the present invention, a method is provided for processing a time varying signal. The method comprises the steps of sampling a time varying signal and providing a sampled time varying signal. The method includes resampling at selected times the sampled time varying signal and varying the selected resample times. The method further comprises providing a resampled time varying signal according to the varied selected resample times.

In accordance with yet another aspect of the present invention, a method is provided for correcting for nonlinearities in modulation systems. The method comprises the steps of transmitting a time varying modulated signal, receiving an echo signal resulting from reflection of the transmitted modulated signal, and comparing the transmitted signal against the echo signal and providing a signal indicative of the comparison. The method further includes the steps of sampling the comparison signal at selected sample times, and effectively varying the selected sample times so as to correct the comparison signal for deviations from a nominal constant frequency resulting from nonlinear frequency modulation of the transmitted time varying modulated signal.

BRIEF DESCRIPTION OF THE DRAWINGS

Further features and advantages of the present invention will become apparent to those skilled in the art to which the present invention relates from reading the following detailed description with reference to the accompanying drawings, in which.

3

Figure 1:
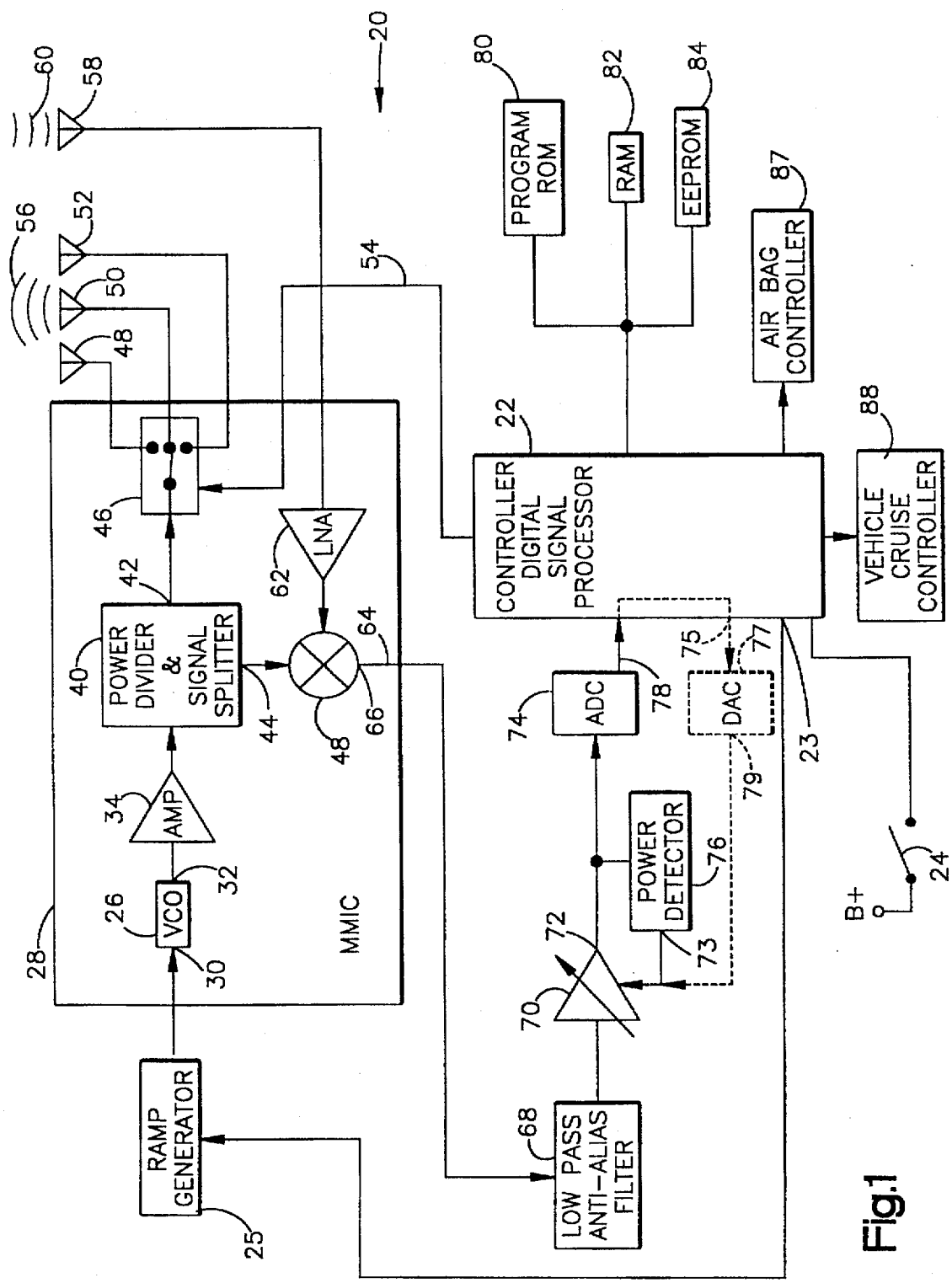
FIG. 1 is a schematic block diagram illustrating an FM ranging radar system made in accordance with the present invention.
Figure 6:
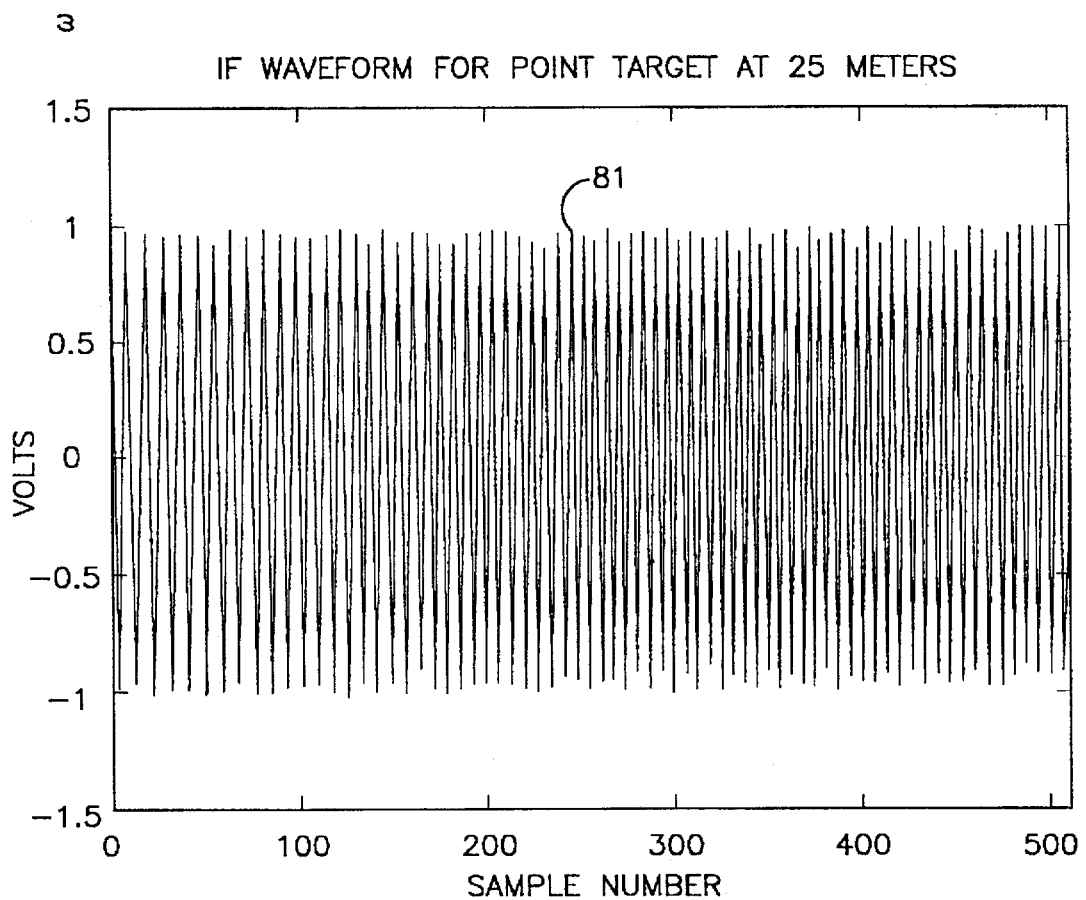
FIG. 6 is a graphical representation of an IF waveform for a target at 25 meters resulting from a nonlinearly frequency modulated transmitted signal.
Figure 7:
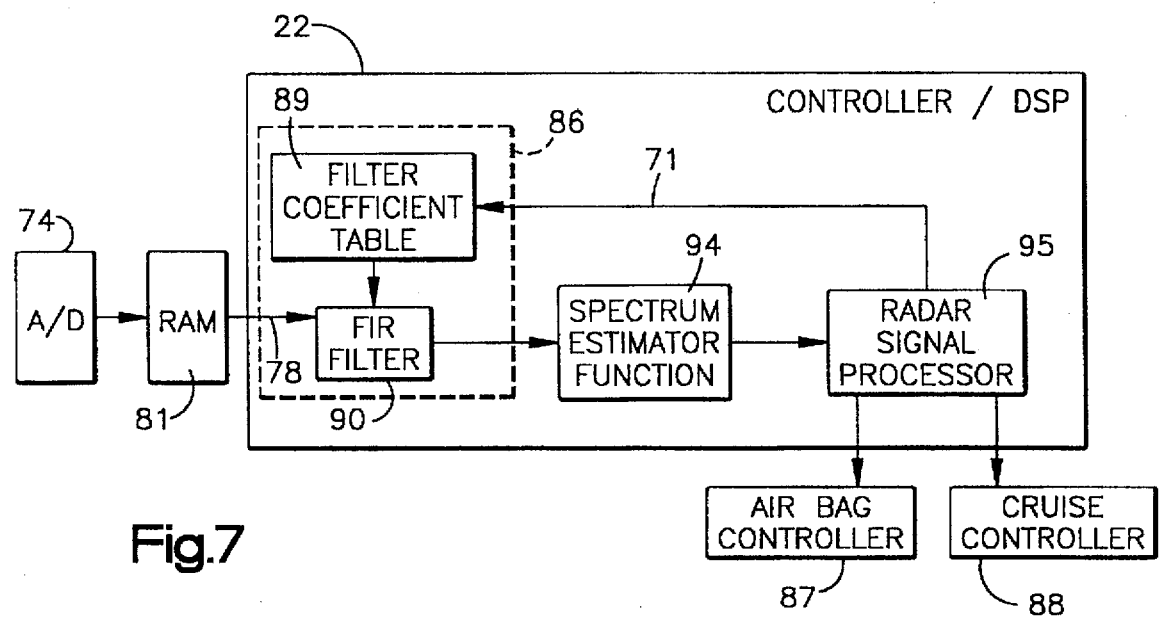
Figure 8:
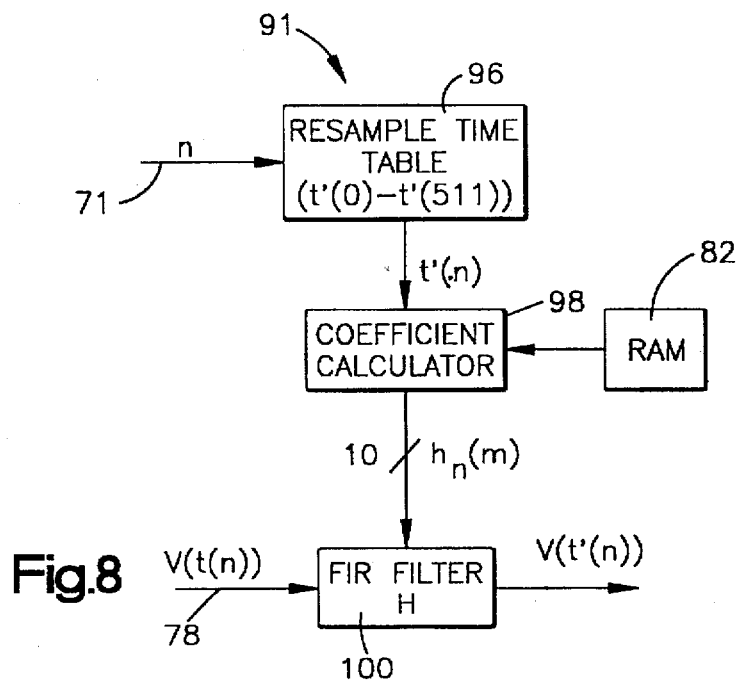
Figure 10:
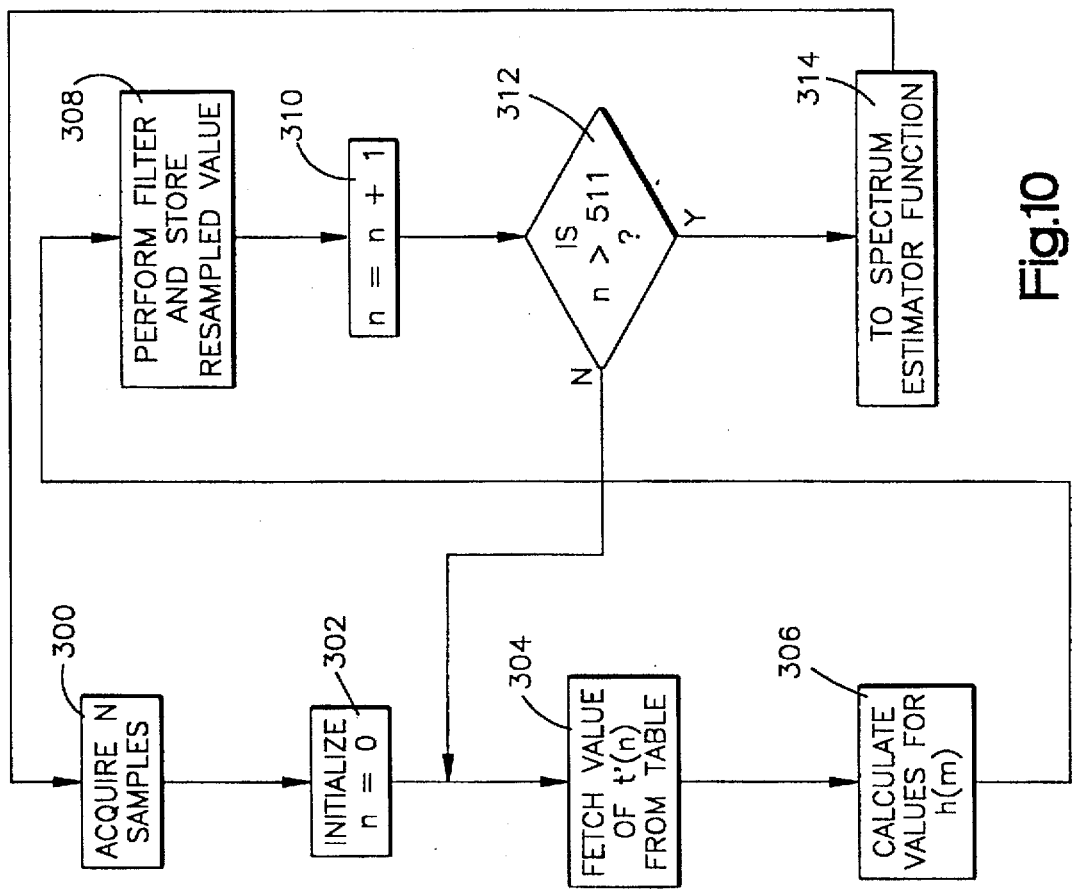
Figure 9:
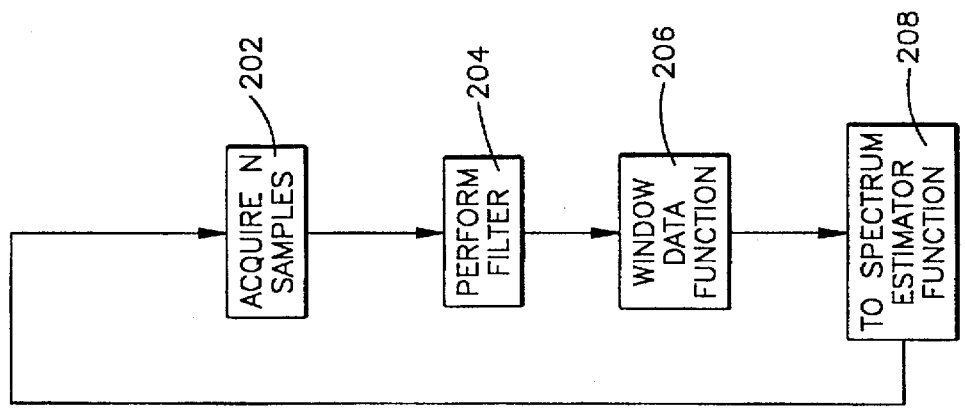
Figure 11:
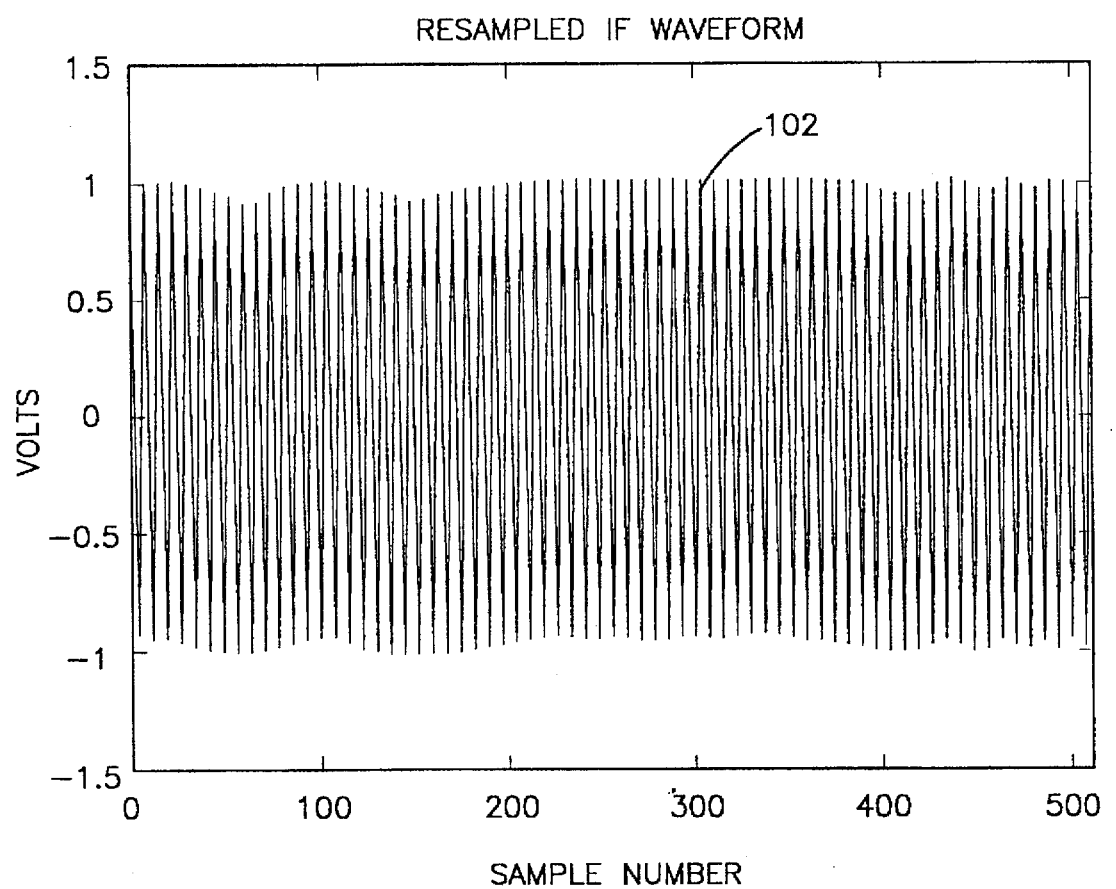

FIG. 7 is a schematic block diagram of a portion of the digital signal processor of FIG. 1;

FIG. 8 is a schematic block diagram of another embodiment of a portion of the present invention;

FIG. 9 is a flow diagram showing the control process of the present invention shown in FIG. 7;

FIG. 10 is a flow diagram showing the control process of the present invention shown in FIG. 8;

FIG. 11 is a graphical representation of a waveform similar to that of FIG. 6 after linearization in accordance with the present invention.

Figure 12:
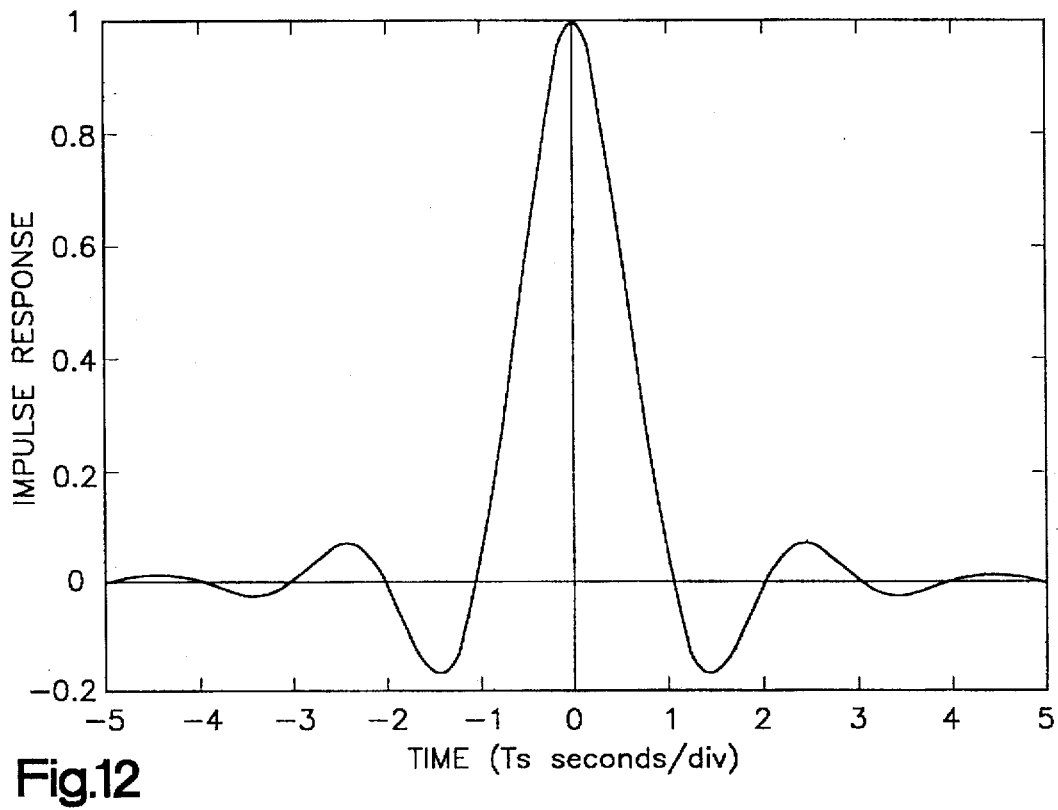
Figure 13:
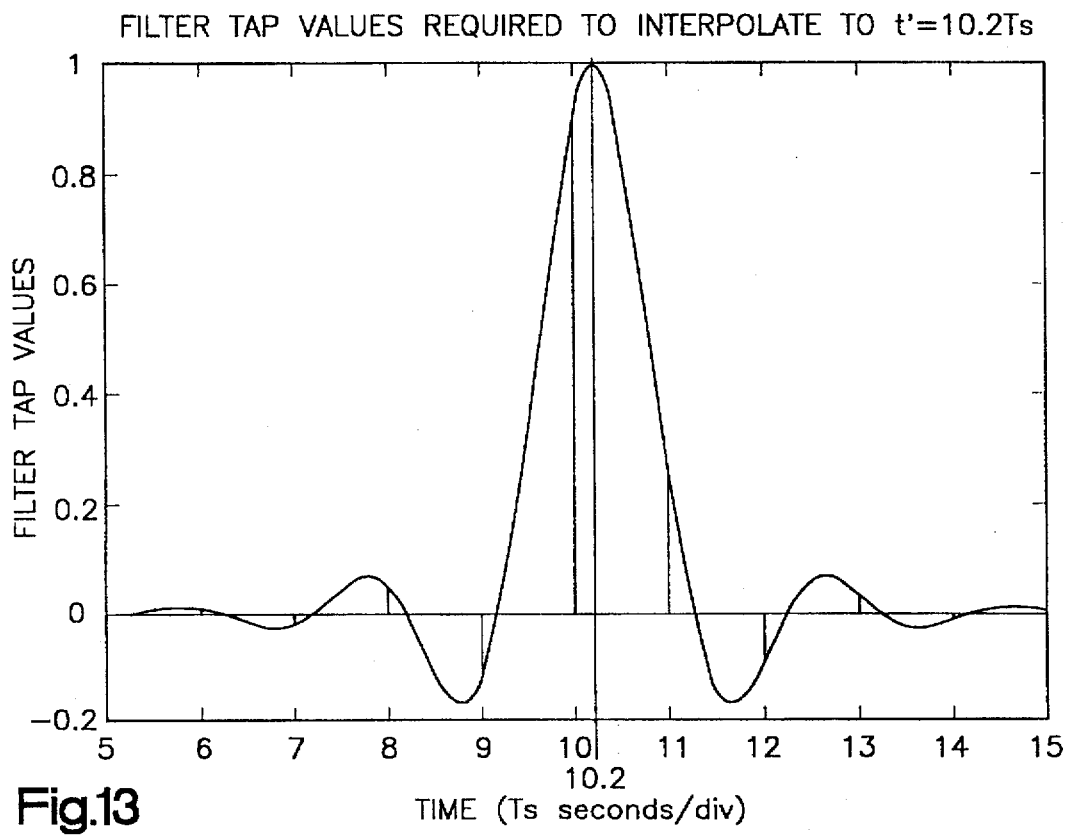

FIG. 12 is a graphical representation of a filter impulse response as a function of time for use in the present invention; and FIG. 13 is a graphical representation of a shifted filter impulse response as a function of time for use in the present invention.

DESCRIPTION OF PREFERRED EMBODIMENT

Referring to FIG. 1, an FM ranging radar system 20, made in accordance with the present invention, includes a controller/digital signal processor 22 ("controller/DSP 22") connected to a source of electric energy. In the embodiment shown, the radar system 20 is installed in a land vehicle; specifically, an automobile. A positive terminal of a vehicle battery B+ is electrically connected to an ignition switch 24. Ignition switch 24 is electrically connected to controller/DSP 22. When actuated to an ON position, ignition switch 24 connects electrical power to controller/DSP 22. Upon energization, controller/DSP 22 initializes the radar system 20. Initialization of pulse radar systems is conventional in the art and, therefore, is not described in detail herein.

Preferably, controller/DSP 22 is a microcomputer. Controller/DSP 22 provides analog square wave pulse control signals to an analog ramp generator 25 from an output 23 of an internal D/A converter (not shown) of controller/DSP 22. It will be appreciated that controller/DSP 22 may alternatively provide a digital signal to an external D/A converter which, in turn, would provide the analog control signals to generator 25. Analog ramp generator 25, in response to the analog square wave pulse control signal, provides a linear voltage ramp signal. The single output voltage ramp signal from generator 25 lasts for a time period T, equal to the time period of an input pulse from controller/DSP 22. Analog ramp generator structures and operation are known in the art and, therefore, will not be further described.

Ramp generator 25 is electrically connected to a voltage controlled oscillator ("VCO") 26 of a monolithic microwave integrated circuit ("MMIC") 28 designed for a pulse radar system. It will be appreciated that components contained in the MMIC 28 may instead be implemented using discrete components. Ramp generator 25 provides the voltage ramp signal to an input 30 of VCO 26. An output 32 of VCO 26 is electrically connected to an amplifier 34. VCO 26 provides an oscillating output signal having a frequency that is functionally related to the input voltage value at input 30. As the ramp voltage provided from ramp generator 25 to VCO 26 increases in value linearly, the frequency of the VCO output signal also increases. As a practical matter, the VCO tuning characteristics of a typical MMIC radar system result in a degree of nonlinearity in the frequency modulation output from the VCO, even though the input is provided with a linear ramp input signal.

Figure 2:
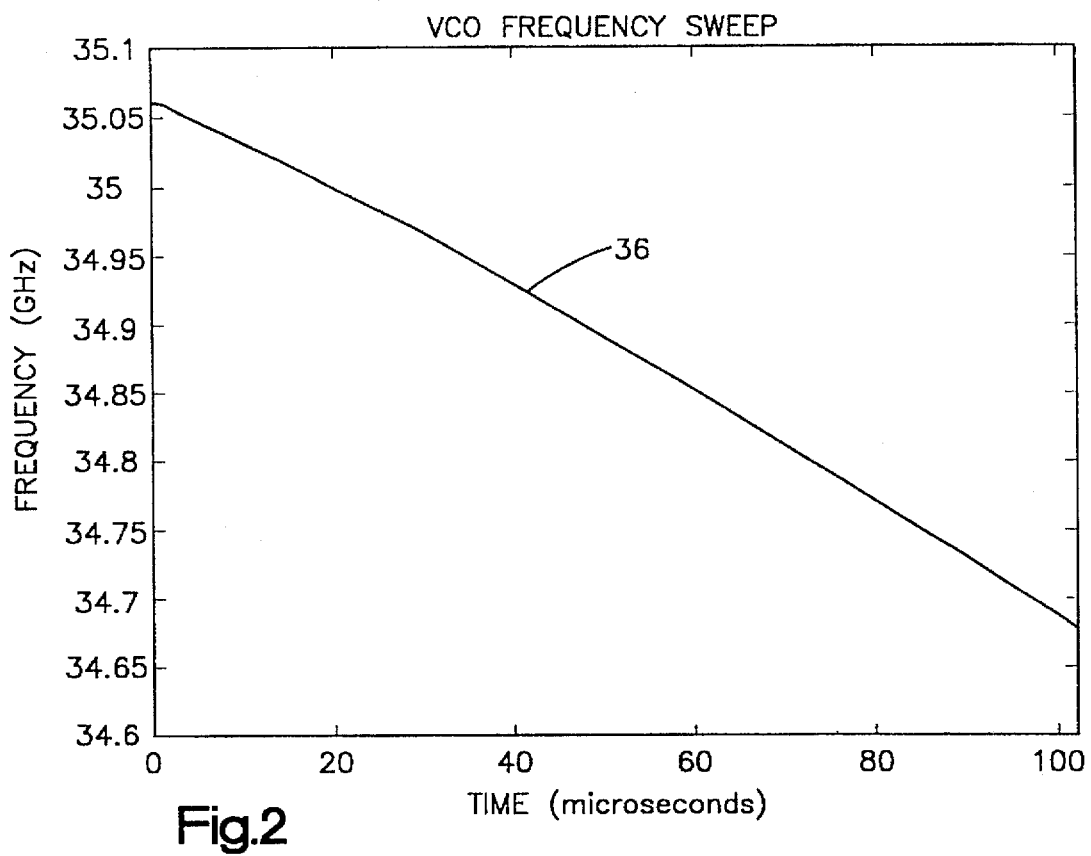
FIG. 2 is a graphical representation of a VCO frequency sweep curve as a function of time for the VCO of FIG. 1.

Referring to FIG. 2, a VCO frequency sweep curve 36 depicts the frequency modulation of an actual chirp waveform from a typical MMIC radar system. A voltage ramp signal from ramp generator 25 linearly increased from 0.2 volts to 0.4 volts. The resulting decrease in frequency of the VCO output signal is shown by VCO frequency sweep curve 36. The voltage ramp duration, T, was 102.2 μsec, thereby resulting in a chirp waveform of the same time duration. The nonlinear chirp waveform represented by curve 36 has a frequency excursion of 387 MHz.

Figure 3:
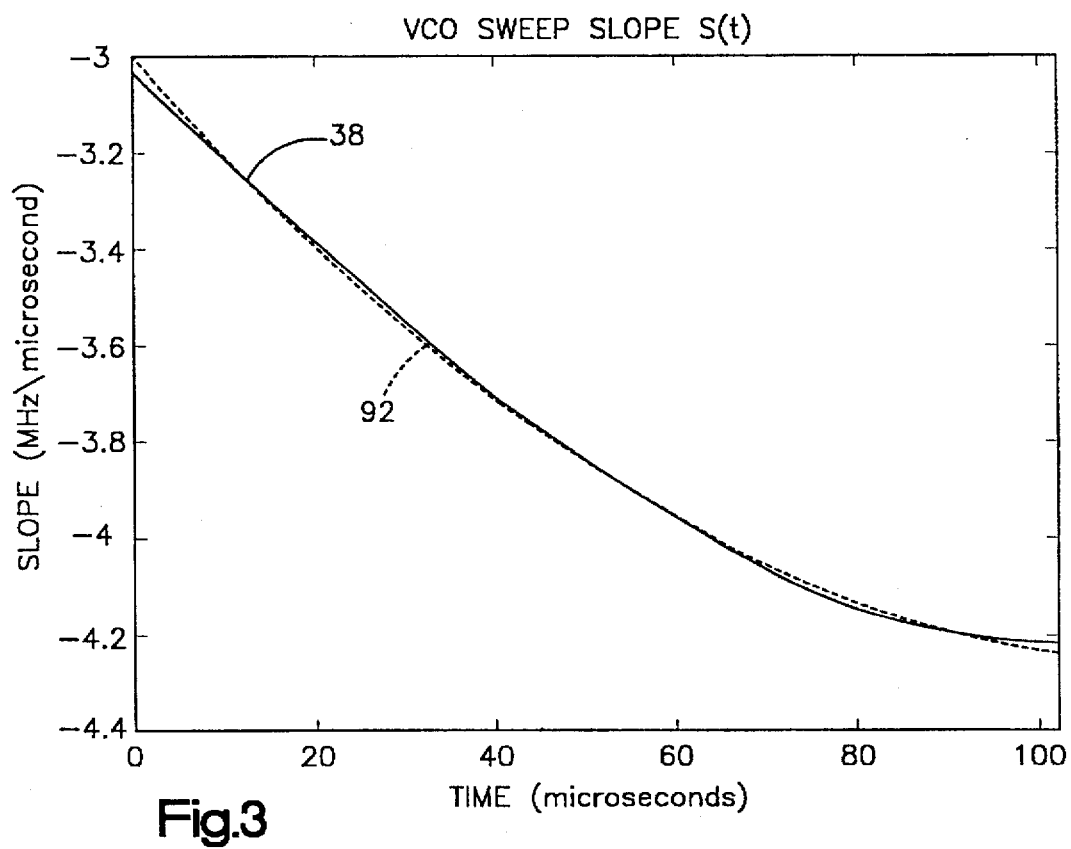
FIG. 3 is a graphical representation of the VCO sweep slope as a function of time for the sweep frequency of FIG. 2.

Referring to FIG. 3, the nonlinearity of the transmit chirp waveform, represented by VCO frequency sweep curve 36 in FIG. 2, will be better appreciated. AVCO sweep slope curve 38 shows the change in slope of VCO frequency sweep curve 36 (FIG. 2) as a function of time. The slope (also designated S(t)) of VCO frequency sweep curve 36 varies from approximately −3 MHz/μsec to −4.2 MHz/μsec over the period T=102.2 μsec.

Referring to FIG. 1, the output of amplifier 34 is electrically connected to a power divider/signal splitter 40. The amplified chirp waveform is provided from amplifier 34 to power divider 40. Power divider 40 has (i) an amplified output 42 electrically connected to a controllable switch 46, and (ii) an amplified output 44 connected to a mixer 48. Power divider/signal splitter 40 provides amplified chirp waveform signals to both controllable switch 46 and to mixer 48.

Controllable switch 46 is operatively connected to (i) a first transmit antenna 48, (ii) a second transmit antenna 50, and (iii) a third transmit antenna 52. Controller/DSP 22 is controllably connected to switch 46 through an antenna select line 54. Transmit antennas 48, 50, and 52 are operatively mounted in the same forward facing direction of the vehicle so as to transmit signals 56 toward a target (not shown). A receiving antenna 58 is operatively mounted on the vehicle in the forward facing direction. Receiving antenna 58 receives reflected echo signals 60 of the transmit signals 56 from the target.

Each of the transmit antennas 48, 50, 52 has a beam width of approximately 3 degrees. Only one transmit antenna transmits a chirp waveform toward the target at a time. As a vehicle travels on a roadway and turns to follow the road, a single transmit antenna may not have sufficient beam width to send a signal capable of striking a target outside of the beam. Consequently, transmit antennas 48, 50, and 52 are mounted at spaced apart locations so as to provide adequate coverage for a wider "radar scene" forward of the vehicle. Controller/DSP 22 switches alternately between the transmit antennas using switch 46 and selects the transmit antenna which provides the strongest return signal to receiving antenna 58.

Receiving antenna 58 is electrically connected to a low noise amplifier 62. The reflected chirp signals 60 are provided by receiving antenna 58 to low noise amplifier 62. Amplifier 62 provides amplified reflected chirp signals to the mixer 48. Using known methods, mixer 48 combines the transmit chirp signal from power divider 40 with the reflected chirp signal from amplifier 62 to produce an intermediate frequency ("IF") waveform signal 64. The frequency of the IF signal is functionally related to the frequency difference between the transmitted signal 56 and the echo 60.

If an ideal linear chirp signal is transmitted, the instantaneous frequency difference between the received echo signal and the transmitted chirp signal is indicative of the distance from the antenna to the target. The instantaneous frequency difference produces an IF waveform with constant frequency, $\omega_{IF}$, which may be expressed as:

$$\omega_{IF} = S\tau_d \quad (1)$$

where "S" is the slope of the transmit chirp waveform in rads/sec$^2$, and $\tau_d$ is the round trip delay between the transmitted signal and the received echo signal in seconds.

Figure 4:
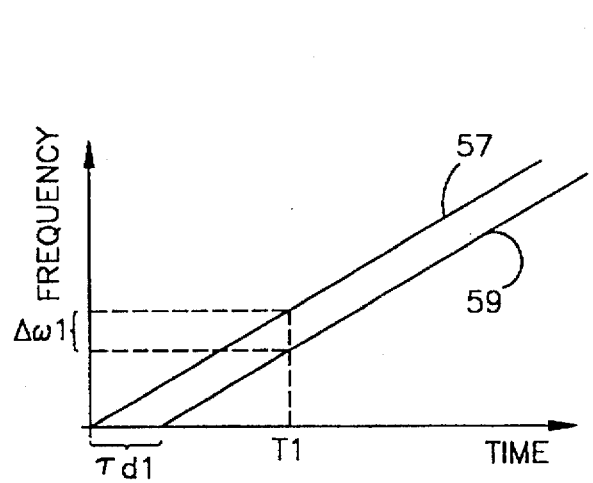
FIG. 4 is a graphical representation of a linear chirp signal and echo signal as a function of time.
Figure 5:
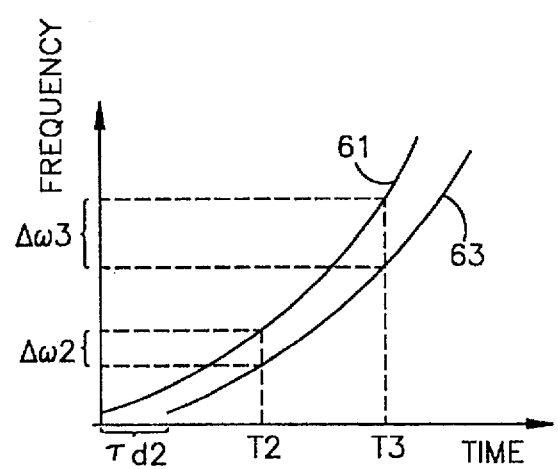
FIG. 5 is a graphical representation of a nonlinear chirp signal and echo signal as a function of time.

Referring to FIGS. 4 and 5, the problem that results from a non-linear VCO will be appreciated. An ideal linear transmit chirp signal 57 is transmitted. After a round trip delay time, $\tau_d 1$, an ideal linear return signal 59 is received. At a time T1 a frequency difference $\Delta\omega 1$ would exist between linear transmit signal 57 and linear return signal 59 producing an IF waveform signal with frequency $\omega_{IF} 1$ at the output of the system mixer. As long as transmit signal 57 and return signal 59 remain perfectly linear and parallel, the frequency difference $\Delta\omega$ at any time T will equal the frequency difference $\Delta\omega 1$ (assuming the target distance remains constant). This constant frequency difference produces a constant IF waveform signal frequency $\omega_{IF} 1$ from the mixer.

A non-linear transmitted chirp may be represented by a time varying frequency slope S(t). Treating the time period of a round trip delay as $\tau_d$ and approximating the slope as being constant during such interval $\tau_d$, the IF waveform may be expressed as:

$$\omega_{IF}(t) = S(t)\tau_d \quad (2)$$

Equation (2) shows the dependance of the IF waveform frequency, $\omega_{IF}(t)$, on the time varying frequency slope S(t) due to the time varying nonlinearity of the transmit chirp for the period t=0 to t=T. Neglecting phase offsets and noise, a typical IF waveform for a single target may be expressed as:

$$v(t) = \cos(\omega_{IF}(t) \cdot t) \quad (3)$$

For a chirp signal beginning at time t=0 and ending at time t=T, the IF waveform $\omega_{IF}(t)$ varies from $\omega_{IF}(0)$ to $\omega_{IF}(T)$.

A nonlinear transmit chirp signal 61 is represented in FIG. 5. A nonlinear return signal 63 is shown which occurs after a round trip delay time, $\tau_d 2$. At a time T2, after processing through mixer 48 as above, a frequency difference $\Delta\omega 2$ between nonlinear transmit signal 61 and nonlinear return signal 63 results in an IF signal with frequency $\Delta\omega 2$. At a time T3, a frequency difference $\Delta\omega 3$ between nonlinear transmit signal 61 and nonlinear return signal 63 results in an IF signal with frequency $\Delta\omega 3$. Due to the nonlinearity of transmit chirp 61 and return chirp 63, the frequency difference $\Delta\omega 3$ at T3 is not equal to the frequency difference $\Delta\omega 2$ at T2. Stated more generally, the frequency difference between the transmit and the return signals changes over time, and therefore, the frequency of the IF waveform changes over time. This change in IF waveform results in a loss of signal to noise ratio ("SNR") and in ambiguous range resolution. If the radar system is used in a vehicle to determine relative velocity from the derivative of the range values, such velocity values will be ambiguous.

Referring again to FIG. 1, the output 66 of mixer 48 provides the IF waveform via line 64 to a low pass anti-alias filter 68. Anti-alias filter 68 provides the filtered IF waveform to an automatic gain control ("AGC") amplifier 70. Filter 68 bandlimits the IF waveform to a frequency below Nyquist criterion, preferably lower than 2 MHz for this radar application. It will be appreciated that the Nyquist criterion for filter bandwidth is based upon the desired signal frequency to be processed. Therefore, other filter types and cutoff frequencies may be selected depending upon the specific desired signal processing requirements.

The output 72 of AGC amplifier 70 is connected to an analog-to-digital ("A/D") converter 74 and a power detector 76. An output 73 of power detector 76 is connected to a control input of AGC amplifier 70. Power detector 76 (i) measures the power from output 72 of AGC amplifier 70, and (ii) provides a signal at output 73 that is functionally related to measured power provided by AGC amplifier 70. AGC amplifier 70 uses the output signal from power detector 76 as a feedback error signal to control the signal amplitude at AGC output 72. The signal amplitude is controlled to a maximum deviation of 2 volts peak-to-peak. The peak-to-peak amplitude of an IF waveform is related to distance from a target. Targets further away produce peak-to-peak IF waveforms which require more amplification than closer targets. Therefore, a variable gain amplifier, such as AGC amplifier 70, provides the desired peak-to-peak signal amplitude regardless of target distance from the vehicle.

It is also contemplated that the amplitude of the signal output from AGC amplifier 70 could be controlled by controller/DSP 22. Specifically, controller/DSP 22 could provide a digital control signal functionally related to the peak-to-peak amplitude of the sampled IF waveform received by controller/DSP 22 from A/D converter 74. The digital control signal would be provided from an output 75 to a digital-to-analog ("D/A") converter 77. An output 79 of D/A converter 77 would be electrically connected to the control input of the AGC amplifier 70. D/A converter 77 would provide an analog control signal to AGC amplifier 70. The output amplitude of AGC amplifier 70 would then be controlled by the analog signal from D/A converter 77 in a manner similar to that of power detector 76 above. D/A converter 77 may also be internal to controller/DSP 22.

Analog-to-digital converter 74 provides a signal sample ("v(t(n))") to a Random Access Memory 81 which, in turn, provides the signal sample to controller/DSP 22 through an output 78. It will be appreciated that controller/DSP 22 may include an internal analog-to-digital converter and RAM such that the analog IF waveform may be directly input to an input terminal of the internal A/D converter. The amplified IF waveform provided by AGC amplifier 70 is (using the same example above) sampled by A/D converter 74 at a uniform rate over the 102.2 µsec chirp pulse duration. Specifically, A/D converter 74 provides 512 uniformly spaced samples, v(t(0)) through v(t(511)), to controller/DSP 22 during the chirp pulse duration.

Referring to FIG. 6, an IF waveform 81, sampled as above without correction provided by the present invention, is shown. This example again assumes a stationary target. It can be seen that the frequency of the IF waveform changes as the sample number increases with sample values taken later in time. A lower frequency is seen at samples taken earlier in time with the frequency gradually increasing at the later samples. The change in frequency is a result of VCO nonlinearity as demonstrated in FIG. 5 above. The change in frequency of the IF waveform 81, representing an actual IF waveform for a target at 25 meters, is 31.2% for this signal.

Referring again to FIG. 1, controller/DSP 22 is operatively connected to (i) a program ROM 80, (ii) a RAM 82, and (iii) an EEPROM 84. It will be appreciated that the appropriate memories may also be internal to controller/DSP 22. Program ROM 80 contains software instructions used by controller/DSP 22 to control the FM ranging radar system 20 in accordance with the present invention. RAM 82 is used to store values such as (i) the sampled IF waveform signal values from A/D converter 74 (ii) digital filter coefficient tables, and (iii) resample time tables.

Controller/DSP 22 is electrically connected to a vehicle cruise controller 88 and an air bag controller 87. The controller/DSP 22 provides electric signals having characteristics indicative of target detection and target speed to cruise controller 88 and air bag controller 87. The air bag controller 87 uses this information for control of deployment of an associated air bag. The ranging system 20 functions as a predictive crash sensor for the air bag control 87. The electrical signals from controller/DSP 22 may also be used by other vehicle systems, for example, object warning systems, collision warning and avoidance systems, blind spot detection, etc.

Referring to FIG. 7, the function of the controller/DSP 22 will be better appreciated. In accordance with a preferred embodiment of the present invention, outputs 71 from the radar signal processor 95, and 78 from A/D converter 74 are provided to a linearizer 86. Output 71 provides the sample number, n, to a filter coefficient table 89. Output 78 provides the then sampled value of the IF waveform, v(t(n)), to a finite impulse response ("FIR") digital filter 90. The digital values of the IF waveform at 78 are available at a predetermined sample rate.

The controller/DSP 22 compensates for the effects of VCO nonlinearity of the IF waveform. Recall that a nonlinear frequency modulation in the transmit chirp signal would result in a varying frequency for the IF waveform when the target range is constant. This frequency variation in the IF waveform would result in (i) a loss of signal to noise ratio ("SNR"), and (ii) ambiguous range resolution. A constant frequency IF waveform is obtained using the present invention by compensating for the nonlinear effects of VCO 26. This compensation, referred to herein as linearization, is accomplished by resampling the IF waveform provided by A/D converter 74. The resampling occurs in linearizer 86 at non-uniformly spaced times, t', such that $$\cos(\omega_{IF}(t'(t)) \cdot t'(t)) = \cos(\omega_{NOM} \cdot t) \quad (4)$$

where t'(t) notation represents a non-uniformly mapped time in a continuous time system. The notation t'(n) represents a non-uniformly spaced time in a discrete time system. By taking the arccosine of both sides of Equation (4), $$\omega_{IF}(t'(t)) \cdot t'(t) = \omega_{NOM} \cdot t \quad (5)$$

where $\omega_{NOM}$ is the nominal constant frequency. The nominal constant frequency $\omega_{NOM}$ is selected such that t'(T)=T where t' is the non-uniform time in a continuous time system at time T and T is the time duration of the chirp signal. This results in $$\omega_{NOM} = \omega_{IF}(T) \quad (6)$$

Substituting Equations (2) and (6) into (5) yields $$S(t'(t) \cdot t'(t) \tau_d = S(T) \cdot T \tau_d \quad (7)$$

Note that $\tau_d$ can be cancelled from Equation (7), indicating that the desired non-uniform resampling time function, t'(t) (in continuous time notation), is independent of target distance and, therefore, will linearize IF waveforms of any frequency. After cancelling $\tau_d$, if N samples of the IF waveform are to be taken, the function t'(t) in Equation (7) can now be evaluated to satisfy the following N equations:

$$S(t'(n)) \cdot t'(n) = S(T) \cdot \frac{nT}{N-1} \quad n = 0, 1, \ldots, N-1 \quad (8)$$

where t'(n) represents the discrete non-uniformly spaced time t' for a sample n, and N is the total number of samples to be taken per pulse duration time period T. In a preferred embodiment of the present invention, 512 samples, i.e., N=512, are taken during the chirp duration T=102.2 µsec.

Referring again to FIGS. 2 and 3, note that the VCO sweep slope curve 38, S(t), shows the change in slope of VCO frequency sweep curve 36 as a function of time. As can be seen by curve 38, the slope of curve 36 varies from approximately −3 MHz/µsec to −4.2 MHz/µsec over 102.2 µsec. It has been empirically determined that the nonlinearity of a typical VCO, as shown by curve 38, can be linearized using the present invention to less than 1% residual nonlinearity by using a 2nd order polynomial approximation of S(t) expressed as:

$$S(t) = c_2 t^2 + c_1 t + c_0 \quad (9)$$

To simplify the calculations, assume the chirp duration is defined as T=1. Then from Equation (9)

$$S(T) = c_2 + c_1 + c_0 \quad (10)$$

Substituting Equations (9) and (10) into Equation (8), the N equations for the non-uniform continuously variable sample times t'(n) become:

$$c_2 t^{\prime 3} + c_1 t^{\prime 2} + c_0 t' - (c_2 + c_1 + c_0) \cdot \frac{n}{N-1} = 0 \quad (11)$$

$$n = 0, 1, \ldots, N-1 \quad (11)$$

This set of N cubic equations is solved to obtain the discrete non-uniform resample times t'(n) (in discrete time notation) that will linearize a nonlinear IF waveform. The desired solution is the root of the polynomial that is in the interval [0,1]. The root of the polynomial may be found by using the method of bisection, as disclosed in "Numerical Recipes in C" by W. Press, Cambridge, Mass., published by Cambridge University Press, 1992, which is hereby fully incorporated herein by reference. It will be appreciated that if the sampled IF waveform is a constant frequency due to a perfectly linear chirp signal, the discrete resample times t'(n) will, in fact, occur at uniform times.

To determine the 512 discrete non-uniform resample times t'(n) for the particular problem encountered with nonlinearity of VCO frequency modulation, the 3rd order polynomials are solved. For other applications, continuously variable multi-rate sample conversion is accomplished using different algorithms to determine the desired resample times or randomly selected resample times. The algorithm selected is dependent upon the specific problem.

Although in the preferred embodiment the algorithm, i.e., Equation 11, used to determine the selected resample times is empirically predetermined, an algorithm used to determine the selected resample times may alternatively be determined in real time. For example, the general form of a polynomial is stored in memory. The IF waveform is sampled for one pulse duration time period T. The amount of non-linearity of the IF waveform is determined by comparing the frequency variation throughout the pulse duration time period. Coefficients for the general polynomial are determined. Next, the polynomials are solved and a set of selected non-uniform resample times are determined. The resample times are evaluated in Equations 12 and 13 and the "linearity" of the resampled IF waveform is determined. If the resampled IF waveform is not sufficiently linear, the coefficients of the general polynomial are changed and a new set of selected non-uniform resample times are determined. This new set of non-uniform resample times is evaluated as above. Once a set of non-uniform resample times provides a sufficiently linear resampled IF waveform, they are stored for real time implementation of the present invention.

The resample times may be determined at a predetermined time, e.g., each time the radar system is energized. This periodic updating of the resample times provides a continuously variable multi-rate sampling system which adapts to, the changes in VCO non-linearity over time. Alternatively, the determination of the resample times by controller/DSP 22 may be performed as a lower priority sub-routine in a series of steps within the controller/DSP 22. Also, a different algorithm may be used to determine the non-uniform resample times that would result in a different non-linearity in the resampled IF signal instead of a linearized IF signal.

Direct non-uniform resampling of the IF waveform is one way to accomplish the linearization. Preferably, non-uniform resample times t'(n) are effectively synthesized with an interpolating digital filter using a continuously variable, multi-rate filtering technique. Assuming that the IF waveform satisfies the Nyquist criterion, the interpolation is accomplished by passing the sampled IF waveform data through a digital low-pass filter. The low-pass filter has an impulse response h(t) and resampling occurs at the determined non-uniform sample times, t'(n).

IF waveform resampling and reconstruction, which produces a linearized resampled IF waveform, can be performed as a discrete time computation on the uniformly spaced sample values $v(mT_s)$, of the IF waveform v(t), by using an interpolating time varying digital filter. The time varying digital filter converts the uniformly spaced sampling to continuously variable multi-rate sampling. The multi-rate sampling is "continuously variable" because the duration of the resample times continuously varies.

An algorithm for a general discrete time implementation of a low pass filter for resampling and reconstruction of an IF waveform, as described above, may be expressed as $$v(t'(n)) = \sum_{m=-\infty}^{\infty} v(mT_s) \cdot h(t'(n) - mT_s) \quad (12)$$

$$n = 0, 1, 2, \ldots, N-1$$

where v(t'(n)) are non-uniformly resampled values of the IF waveform v(t), $v(mT_s)$ are uniformly sampled values of the IF waveform v(t), and $h(t'(n)-mT_s)$ represents an impulse response of a low-pass filter for a non-uniform time step t'(n) shifted by $mT_s$, and $T_s$ are uniformly spaced intervals equal to T/(N−1) where T is the pulse duration time period, and N is the total number of samples taken during the pulse duration, e.g., 512 samples.

An ideal interpolation filter has (i) a magnitude response of $|H(\omega)|=1$ and a phase shift $\Theta=0$ for frequencies below $f_s/2$, where $f_s$ is the sample rate, and (ii) a magnitude response of $|H(\omega)|=0$ for frequencies above $f_s/2$. Due to the periodicity in the frequency domain that results from uniform sampling, the discrete time implementation of this ideal filter will have a magnitude response of $|H(\omega)|=1$ for all frequencies. Assuming that the sampled signal is bandlimited to a frequency below Nyquist $f_s/2$, as described above using filter 68, the filter design should approximate these characteristics over the bandwidth of the passed IF signal.

A linear phase FIR filter having an impulse response of the general form (sin x)/x, designed using a known window design method, provides a filter satisfying the above requirements. A FIR filter with an impulse response h(t) that minimizes the integral squared error between the desired frequency response and the actual frequency response can be found by truncating h(t) to length $MT_s$, where M is the order of the filter. A known window function is then applied to h(t) to reduce Gibbs oscillations caused by the truncation. Other algorithms are contemplated which may be used to design a linear phase FIR filter, e.g. the Parks-McClellan algorithm.

Applying the method described above, a preferred impulse response function h(t) of the interpolating filter and a Hamming window may be expressed as $$h(t) = \frac{\sin\left(\frac{\pi t}{T_s}\right)}{\frac{\pi t}{T_s}} \left[ .54 - .46\cos\left(\frac{2\pi \cdot t}{MT_s}\right) \right] - \quad (13)$$

$$\left(\frac{M}{2}\right)T_s < t < \left(\frac{M}{2}\right)T_s$$

where $\sin(\pi t/T_s)/(\pi t/T_s)$ is the impulse response of the low pass filter of the form sin x/x, M=10 for a 10th order (10 tap) filter, and 0.54−0.46 cos $[(2\pi t/MT_s]$ is the implementation of the Hamming window. FIG. 12 shows the impulse response for the interpolation filter expressed in Equation 13, including both the low pass filter and the Hamming window.

Referring again to FIG. 7, in accordance with a preferred embodiment of the present invention, sufficient storage capacity is available for a coefficient table 89 having ten filter tap coefficient values for each of the 512 samples. Equations 12 and 13 provide the ten filter tap coefficient values h(n) of the low pass filter 90 with the window function applied. The filter coefficient values are determined by evaluating Equation 12 with the impulse response of Equation 13 substituted for $h(t'(n)-mT_s)$ for each sample. Equation 12 is solved for each sample with $t=(t'(n)-mT_s)$, M=10, and $T_s=1$. Each sample has a corresponding set of 10 filter tap values. The evaluation of Equations 12 and 13 within the boundaries indicated for "t" provides only ten non-zero values of $h(t'(n)-mT_s)$ per sample n. The ten non-zero values of $h(t'(n)-mT_s)$ for each sample are the filter tap coefficient values which are stored in filter coefficient table 89.

The interpolating low pass filter 90 is a time varying linear system in which the impulse response h(m) changes with each time step n. Filter coefficient table 89 is used to store the filter tap coefficient values, as described above, and provides the filter coefficient values h(m) to FIR filter 90. Since each filter output filter v(t'(n)) has a corresponding set of 10 filter tap values, filter coefficient table 89 is a 10×512 matrix of values. The sampled data $v(mT_s)$ from A/D output 78 are provided to FIR filter 90. The filter coefficient values from coefficient table 89 and the sampled data from A/D converter 74 are processed in FIR filter 90 to produce the resampled filtered output v(t'(n)). The resampled output v(t'(n)) is provided to a spectrum estimation function 94. Spectrum estimator functions are known in the art and, therefore, will not be further described. The output of spectrum estimator 94 is provided to radar signal processor 95. The output of radar signal processor 95 provides signals to other vehicle systems as described above.

Referring to FIG. 9, the control process of linearizer 86 shown in FIG. 7, which performs the interpolating low pass filter and window algorithm described above, will be better appreciated. In step 202, linearizer 86 acquires "N" IF signal samples v(n) for n=0,1,2, . . . , N−1 from A/D converter 74. Next, in step 204, the filter algorithm is performed. Recall that the filter is a 10×512 matrix of filter coefficient values stored in filter coefficient table 89. Filter coefficient table 89 has 10 filter tap values for each of the 512 sample values. Filter coefficient table 89 provides ten filter tap values to FIR filter 90 for each filter output value v(t'(n)). The values provided to FIR filter 90 are used in the filter algorithm to determine the resampled signal values v(t'(n)). The filter algorithm preferably is performed according to $$v(t'(n)) = \sum_{m'=-\frac{M}{2}}^{\frac{M}{2}-1} v(m' + \lceil t''(n) \rceil) \cdot h(n,m') \quad (14)$$

$$n = 0, 1, 2, \ldots, N-1$$

where N is the number of samples, M is the filter order (even), h(n,m') is an N×M array of filter coefficients with row n corresponding to the M filter coefficients at time step n, v(t'(n)) is the resampled data, $T_s$ is 1 sample period, and t''(n)=(N−1)t'(n). Equation 14 is evaluated with $T_s$=1 and v(m'+⌈t''(n)⌉)=0 when m'+⌈t''(n)⌉<0 and m'+⌈t''(n)⌉>N−1 where the brackets ⌈ ⌉ indicates "least integer greater than." In step 206, FIR filter 90 provides the values "linearized" IF waveform v(t'(n)) to spectrum estimator function 94. Next, in step 208, spectrum estimator function 94 provides the resampled IF waveform signal to radar signal processor 95.

Referring to FIG. 11, a resampled linearized IF waveform 102, of the nonlinear IF waveform 81 in FIG. 6, is shown. It can be seen that the frequency of IF waveform 102 is constant across the samples. Radar signal processor 95, using methods known in the art, processes the linearized IF waveform to (i) detect targets within the radar "scene" and, (ii) track a target once detected. Target detection includes classifying a target as a real threat or clutter. Tracking includes using algorithms to determine the trajectory of the target and monitor changes in position and trajectory of the target. Radar signal processor 95 provides control signals to other vehicle systems in response to the target data described above.

Referring to FIG. 8, another embodiment of the present invention is shown for use in a system having insufficient memory to store a 10×512 matrix of filter coefficients. Outputs 71 and 78 from A/D converter 74 provide the sample number and sampled IF waveform to a linearizer 91. Output 71 provides the sample number n, to a resample time table 96. Resample time table 96 contains the non-uniform resample times t'(0) to t'(511), as determined using Equation 11 above. Resample time table 96 provides the non-uniform resample times t'(n) to a coefficient calculator function 98.

Since the resample times t'(n) are non-uniformly spaced, the ten filter tap coefficients are different for each differently spaced time step. The ten filter tap coefficients for an individual sample are determined in coefficient calculator 98. The filter tap coefficient values are determined according to the impulse response for the digital filter as expressed in Equation 13 above and shown in FIG. 12. In the present embodiment, the impulse function of Equation 13 is evaluated and 321 impulse response values with respect to time are stored in RAM 82 for use by coefficient calculator 98. The 321 values are stored at uniformly spaced time intervals.

As described above, the series of filter coefficient values h(−M/2), h((−M/2)+1)), . . . , h((M/2)−1) are determined using the previously stored values of the impulse response shown in FIG. 12. In the present invention, the resample times are non-uniform. Since the resample time periods are non-uniform, the impulse function is shifted by a fractional amount from the "origin" relative to a stored local maximum value of the impulse function located at a uniform time period. For example, the tenth resample time may occur at time 10.2. If the impulse function h(t'(n))−m'$T_s$ is evaluated with t'(n)=10.2 and m'$T_s$=10, then the impulse function shown in FIG. 12 will be shifted by 0.2 as shown in FIG. 13. The local maximum value of the impulse function for each of the ten filter tap coefficient values in FIG. 13 are similarly shifted. The filter tap values at times 6–15 are determined using linear interpolation. These determinations result in ten interpolations for each non-uniform sample t'(n). For each interpolation, y is a local filter tap value and x is a value corresponding to the amount the impulse function of FIG. 12 is shifted. The filter tap values from the shifted impulse function are obtained by interpolating between the two closest adjacent stored impulse function values of the 321 stored values which are on either side of a filter tap location. The shifted value x is the fractional amount of time the non-uniform time t'(n) is shifted from a uniform time for the stored impulse function of FIG. 12. The ten filter coefficient values $h_n$(m') and the uniformly sampled data v(t(n)) from A/D output 78 are provided to FIR filter 100. FIR filter 100 processes the uniformly sampled data and the filter coefficients to provide the filtered resampled linerized output v(t'(n)) to spectrum estimator function 94. Spectrum estimator function 94 provides the resampled IF waveform to radar signal processor 95 as described above.

Referring to FIG. 10, the control process of linearizer 91 in digital signal processor 22, shown in FIG. 8, will be better appreciated. Starting with step 300, linearizer 91 acquires "N" uniformly spaced IF signal samples v(n) for n=0,1,2, . . . , N−1 from A/D converter 74. Next, in step 302, linearizer 91 is initialized and "n" is set equal to zero. In step 304, radar signal processor 95 provides a uniform sample number "n" to linearizer 91 on line 71. A corresponding non-uniform resample time t'(n) is fetched from resample time table 96. The process then proceeds to step 306. In step 306, the ten filter tap coefficient values for the non-uniform resample time step t'(n) are determined. Since the time steps are non-uniform, each different non-uniform time step has a different set of ten filter tap coefficients.

Coefficient calculator 98 determines the fractional amount of time that the impulse function of FIG. 12 is to be shifted for the specific non-uniform resample value, e.g., a shift of 0.2 for the non-uniform time period of 10.2 shown in FIG. 13 for a tenth sample "n". The 321 stored values of the impulse function shown in FIG. 12 are recalled from RAM 82. The impulse function of FIG. 12 is shifted the appropriate amount as shown in FIG. 13. Once the impulse function is shifted, each of the ten filter tap values for the shifted impulse function in FIG. 13 are determined by linear interpolation between two impulse function values adjacent to a filter tap. The impulse function values are obtained from the 321 stored impulse function values. In the example shown in FIG. 13, linear interpolation as described above is used to determine the filter tap values corresponding to the filter taps at 6, 7, . . . , 15. These filter tap values are the filter coefficients, for this non-uniform resample time, i.e., 10.2, which "linearizes" the tenth uniform sample of the IF waveform provided by A/D converter 74. The process then proceeds to step 308.

In step 308, the filter is performed, ten of the stored uniformly sampled values from step 300 are provided to FIR filter 100. Coefficient calculator 98 provides the filter coefficients to FIR filter 100. FIR filter 100 is performed according to $$v(t'(n)) = \sum_{m'=-\frac{M}{2}}^{\frac{M}{2}-1} v(m' + \lceil t''(n) \rceil) \cdot h_n(m') \tag{15}$$

$$n = 0, 1, \ldots, N-1$$

and evaluated within the defined boundaries of $$v(m' + \lceil t''(n) \rceil) = 0 \quad \begin{array}{l} m' + \lceil t''(n) \rceil < 0 \\ m' + \lceil t''(n) \rceil > N-1 \end{array} \tag{16}$$

where N is the number of samples, M is the filter order (even), v(t'(n)) is the re-sampled data, $h_n(m')$ are the filter coefficients at time step t'(n), $T_s$ is the sample period which is set equal to one (1), and t''(n)=(N-1)t'(n) is the resample time in the units of a new time scale with $T_s$=1 and T=N-1. The resampled value v(t'(n)) for this sample is stored. In step 310, the value of "n" is incremented by one. In step 312, a determination is made as to whether n>511. If the determination is negative, the process loops back to step 304 where the next non-uniform resample time value t'(n) is fetched, processed, and a resulting value for v(t'(n)) stored. If the determination in step 312 is affirmative, indicating that the filter has been performed on all the samples, the process proceeds to step 314. In step 314, the stored resampled signal values v(t'(n)), representing the linearized IF waveform, are provided to spectrum estimator function 94. Spectrum estimator function 94 provides the resampled waveform to radar signal processor 95 and the process loops back to step 300. Radar signal processor 95 provides control signals as described above to other vehicle systems.

Although the described embodiment stores the non-uniform resample times in resample time table 96, one skilled in the art will appreciate that the filter coefficients can be derived in real time using algorithms such as Equations 11, 12, and 13. In other words, Equation 11 may be solved by controller/DSP 22 to provide the non-uniform sample times. Equations 12 and 13 would use the non-uniform sample times to provide the filter coefficient values.

The specific discrete time implementation of the filter of the embodiment shown in FIG. 8, which is expressed in Equation 15 and performed in step 308, is developed from the general discrete time filter implementation expressed in Equation 12. Equation 12 is the implementation of a digital filter having a filter transfer function $h(t'(n)-mT_s)$ evaluated at a non-uniform time. A suitable filter impulse response h(t), with a window function, for use in Equation 12 is shown in Equation 13. Equations 12 and 13 are evaluated together to implement the digital filter with $t=(t'(n)-mT_s)$. The practical implementation Equation 13 is truncated outside the range $-(M/2)T_s < t < (M/2)T_s$.

For each value of "n" there are only M non-zero values for $h(t'(n)-mT_s)$ in the infinite sum of Equation 12. The non-zero terms are determined by $$-\frac{M}{2} T_s < (t'(n) - mT_s) < \frac{M}{2} T_s \tag{17}$$

$$-\frac{M}{2} T_s - t'(n) < -mT_s < \frac{M}{2} T_s - t'(n)$$

$$-\frac{M}{2} T_s + t'(n) < mT_s < \frac{M}{2} T_s + t'(n)$$

$$\left\lceil -\frac{M}{2} + \frac{t'(n)}{T_s} \right\rceil < m < \left\lfloor \frac{M}{2} + \frac{t'(n)}{T_s} \right\rfloor$$

or also expressed as $$-\frac{M}{2} + \left\lceil \frac{t'(n)}{T_s} \right\rceil < m < \frac{M}{2} + \left\lfloor \frac{t'(n)}{T_s} \right\rfloor \tag{18}$$

where $\lceil \ \rceil$ indicates "least integer greater than" and $\lfloor \ \rfloor$ indicates "greatest integer less than." The infinite series of Equation 12 which is evaluated for the non-zero terms may be expressed as $$v(t'(n)) = \sum_{m=-\frac{M}{2} + \left\lceil \frac{t'(n)}{T_s} \right\rceil}^{\frac{M}{2} + \left\lfloor \frac{t'(n)}{T_s} \right\rfloor} v(m) \cdot h(t'(n) - mT_s) \tag{19}$$

$$n = 0, 1, 2, \ldots, N-1$$

by defining a new summation index variable $m' = m - \lceil t'(n)/T_s \rceil$ Equation 19 may be written $$v(t'(n)) = \sum_{m'=-\frac{M}{2}}^{\frac{M}{2} + \left\lfloor \frac{t'(n)}{T_s} \right\rfloor - \left\lceil \frac{t'(n)}{T_s} \right\rceil} v\left(\left(m' + \left\lceil \frac{t'(n)}{T_s} \right\rceil\right) T_s\right) \cdot h\left(t'(n) - m'T_s - \left\lceil \frac{t'(n)}{T_s} \right\rceil T_s\right) \tag{20}$$

In equation 20, $\lfloor t'(n)/T_s \rfloor - \lceil t'(n)/T_s \rceil = -1$, except when $t'(n) = kT_s$, in which case it is zero. Therefore, $$v(t'(n)) = \sum_{m'=-\frac{M}{2}}^{\frac{M}{2}-1} v(m'T_s + \left\lceil \frac{t'(n)}{T_s} \right\rceil T_s) \cdot h(t'(n) - m'T_s - \left\lceil \frac{t'(n)}{T_s} \right\rceil T_s) \quad t'(n) \neq kT_s \tag{21}$$

and $$v(t'(n)) = \sum_{m'=-\frac{M}{2}}^{\frac{M}{2}} v(m'T_s + \left\lceil \frac{t'(n)}{T_s} \right\rceil T_s) \cdot h(t'(n) - m'T_s - \left\lceil \frac{t'(n)}{T_s} \right\rceil T_s) \quad t'(n) = kT_s \tag{22}$$

In equation 22, when $t'(n) = kT_s$, the term in the sum when m'=M/2 is equal to zero. Therefore, $$v(t'(n)) = \sum_{m'=-\frac{M}{2}}^{\frac{M}{2}-1} v(m'T_s + \left\lceil \frac{t'(n)}{T_s} \right\rceil T_s) \cdot h(t'(n) - m'T_s - \left\lceil \frac{t'(n)}{T_s} \right\rceil T_s) \tag{23}$$

If $$\tau_n = \frac{t'(n)}{T_S} - \left\lceil \frac{t'(n)}{T_S} \right\rceil \quad (24)$$

the impulse response term of Equation 23 reduces to $$h(t'(n) - m'T_S - \left\lceil \frac{t'(n)}{T_S} \right\rceil T_S) = h((\tau_n - m')T_S) \quad (25)$$

Since $h(-t) = h(t)$, equation (25) reduces further to $$h(t'(n) - m'T_S - \left\lceil \frac{t'(n)}{T_S} \right\rceil T_S) = h((m' - \tau_n)T_S) \quad (26)$$

where $t'(n)$ is in the range $[0,1]$. Substituting (26) into (23)

$$v(t'(n)) = \sum_{m'=-\frac{M}{2}}^{\frac{M}{2}-1} v((m' + \left\lceil \frac{t'(n)}{T_S} \right\rceil)T_S) \cdot h((m' - \tau_n)T_S) \quad (27)$$

Defining a new resample time variable $$t''(n) = \frac{t'(n)}{T_S} = (N-1)t'(n) \quad (28)$$

then $$v(t'(n)) = \sum_{m'=-\frac{M}{2}}^{\frac{M}{2}-1} v((m' + \lceil t''(n) \rceil)T_S) \cdot h((m' - \tau_n)T_S) \quad (29)$$

To simplify the expression for $v(t'(n))$ and make the expression suitable for discrete time computation, the timescale is redefined so that $T_s=1$. Therefore, $$v(t'(n)) = \sum_{m'=-\frac{M}{2}}^{\frac{M}{2}-1} v(m' + \lceil t''(n) \rceil) \cdot h(m' - \tau_n) \quad (30)$$

Defining $h(m'-\tau_n) = h_n(m')$ and substituting into equation (30) yields $$v(t(n)) = \sum_{m'=-\frac{M}{2}}^{\frac{M}{2}-1} v(m' + \lceil t''(n) \rceil) \cdot h_n(m') \quad (31)$$

$n = 0, 1, \ldots, N-1$

Equation (31) is evaluated with $v(m' + \lceil t''(n) \rceil)$ defined as zero for all values $m' + \lceil t''(n) \rceil$ outside the range $[0, N-1]$. Equation 31 is a specific discrete time implementation of a low pass filter developed from the general discrete implementation in Equation 12 and shown in FIGS. 8 and 10.

One skilled in the art will appreciate that one advantage of the present invention is that using digital signal processing to linearize the effects of VCO non-linearity results in a system which can adapt to non-linearities which may develop in the VCO over time. In other words, the filter algorithm in the signal processor can be changed to compensate for changing non-linear characteristics in the VCO. This determination of an appropriate algorithm may be performed in real time.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for processing time varying signals, said apparatus comprising:

means for sampling a time varying signal and providing a sampled signal;

means for resampling said sampled signal at selected resample times; and means for varying said selected resample times and providing a resampled time varying signal according to said varying selected resample times.

2. The apparatus of claim 1 wherein said means for varying said selected resample times includes control means for determining an algorithm for determining said selected resample times.

3. The apparatus of claim 1 wherein said means for varying said selected resample times includes means for controlling said resample times so that said resample times are continuously variable in duration.

4. The apparatus of claim 3 wherein the duration of said continuously variable resample times are non-uniform.

5. The apparatus of claim 3 wherein said continuously variable duration of said resample times is non-periodic.

6. The apparatus of claim 3 wherein said continuously variable resample times are stored in a look-up table.

7. An apparatus for correcting for nonlinearities in modulation systems, said apparatus comprising:

means for transmitting a time varying modulated signal;

means for receiving an echo signal resulting from reflection of said transmitted modulated signal;

means for comparing said transmitted signal against said received echo signal and providing a comparison signal indicative of said comparison;

means for sampling of said comparison signal and providing a sampled comparison signal;

means for resampling said sampled comparison signal at selected resample times; and means for effectively varying said selected resample times so as to correct said comparison signal for nonlinearities in said comparison signal resulting from nonlinearities of the transmitted time varying modulated signal.

8. The apparatus of claim 7 wherein said means for effectively varying said selected resample times includes means for controlling said resample times so that said resample times are non-uniform.

9. The apparatus of claim 7 wherein said means for effectively varying said selected resample times includes means for controlling said resample times so that said resample times are non-uniform and said control means includes means for filtering said comparison signal with a continuously variable multi-rate interpolating filter.

10. The apparatus of claim 7 wherein said means for transmitting includes a voltage controlled oscillator and means for driving said voltage controlled oscillator with a ramp signal.

11. The apparatus of claim 10 wherein said means for comparing includes a mixer for providing a signal having a frequency functionally related to the difference in frequency between said transmitted signal and said echo signal.

12. The apparatus of claim 10 wherein said signal indicative of said difference is an intermediate frequency waveform.

13. The apparatus of claim 10 wherein said means for transmitting transmits a radar signal.

14. The apparatus of claim 13 wherein said frequency difference is functionally related to the distance between said means for transmitting and a target.

15. The apparatus of claim 7 wherein said means for transmitting includes means for transmitting a frequency modulated signal.

16. The apparatus of claim 7 wherein said varying selected resample times are stored in a look-up table.

17. A method for processing time varying signals, said method comprising the steps of:

sampling a time varying signal;

providing a sampled time varying signal;

resampling at selected times said sampled time varying signal;

varying said selected resampling times; and providing a resampled time varying signal according to said varied selected resample times.

18. The method of claim 17 wherein said step of varying said selected resample times includes the step of controlling said selected resample time so that said selected resample times are continuously variable in duration.

19. The method of claim 17 wherein said step of varying said selected resample times includes the step of controlling the duration of said selected resample times so that said selected resample times are non-uniform.

20. The method of claim 18 wherein said step of varying said continuously variable selected resample times includes the step of controlling the duration of said continuously variable selected resample times so that said continuously variable selected resample times are non-periodic.

21. The method of claim 17 wherein the step of varying said selected resampling times includes the step of determining an algorithm for determining said selected resample times.

22. A method for correcting for nonlinearities in modulation systems, said method comprising the steps of;

transmitting a time varying modulated signal;

receiving an echo signal resulting from reflection of said transmitted modulated signal;

comparing said transmitted signal against said echo signal and providing a signal indicative of said comparison;

sampling said comparison signal and providing a sampled comparison signal;

resampling said sampled comparison signal at selected resample times; and effectively varying said selected resample times so as to correct said comparison signal for deviations from a nominal constant frequency resulting from nonlinear frequency modulation of the transmitted signal.

23. The method of claim 22 wherein said step of effectively varying said resample times includes the step of controlling the resampling times of said samplings of said comparison signal so that said resampling times are non-uniformly spaced.

24. The method of claim 22 wherein said step of effectively varying said resample times includes the step of controlling said resample times so that said resample times are non-uniformly spaced, said varying of said resample times including the step of filtering said comparison signal using a continuously varying multi-rate interpolation filter.

25. The method of claim 22 wherein said step of transmitting a frequency modulated signal includes the step of varying the frequency of said time varying signal in response to a ramp function.

26. The method of claim 22 wherein said step of transmitting includes transmitting a frequency modulated signal and wherein said step of comparing includes the step of determining the frequency difference between the transmitted signal and the received echo signal.

27. The method of claim 22 wherein said step of transmitting includes transmitting a radar signal.

* * * * *